Figure 1:
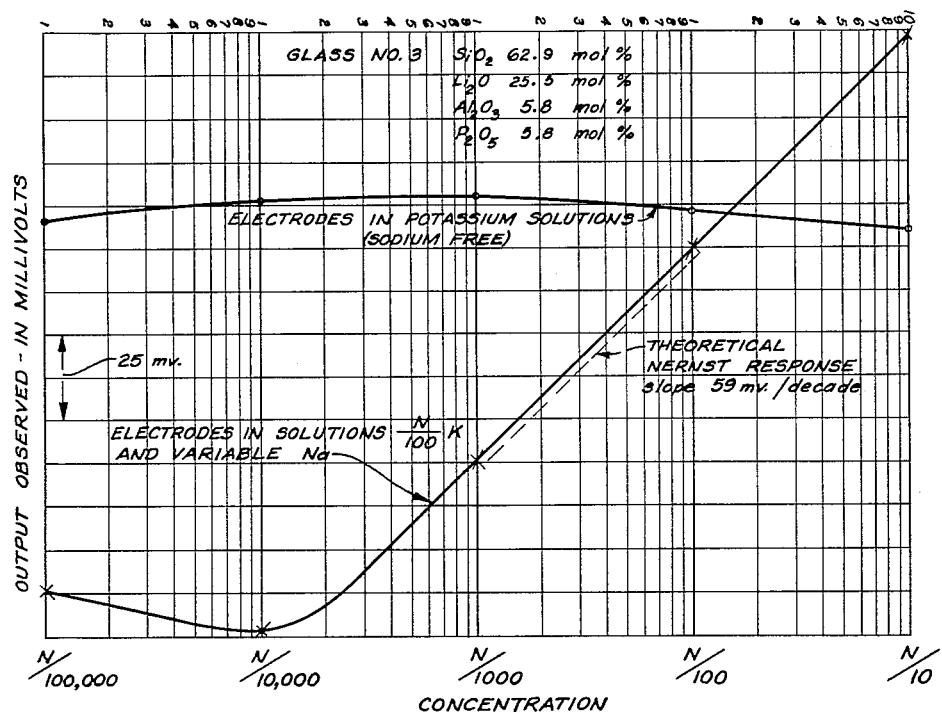

Aug. 4, 1964         E. P. ARTHUR ETAL         3,143,488
LITHIA-ALUMINA-SILICA GLASS CONTAINING PHOSPHORUS
Filed Oct. 24, 1960

INVENTORS
EDWIN P. ARTHUR,
JOHN E. LEONARD
BY THEIR ATTORNEYS
HARRIS, KIECH, RUSSELL & KERN

United States Patent Office 3,143,488
Patented Aug. 4, 1964

3,143,488
LITHIA-ALUMINA-SILICA GLASS CONTAINING PHOSPHORUS
Edwin P. Arthur and John E. Leonard, Fullerton, Calif., assignors to Beckman Instruments, Inc., a corporation of California
Filed Oct. 24, 1960, Ser. No. 64,556
7 Claims. (Cl. 204—195)

This invention relates to glass and, in particular, to ionic sensitive glasses suitable for use in electrochemical electrodes and the like.

Glass electrodes can be used in the measurement of alkali ion concentration in liquids and, in particular, in measuring sodium ion concentration.

The selectivity of an electrode toward a first ion in the presence of a second ion may be measured by the response of the electrode toward varying concentrations of the first ion, the second ion being also present in widely varying amounts. An ideal electrode would exhibit ideal "Nernstian response," i.e., at 25° C. an ideal electrode would always produce a 59.16 mv. change per tenfold change of concentration of the first ion, regardless of background amounts of potentially interfering ions. A figure of merit for a glass electrode with respect to a particular ion or class of ions is the actual response of the electrode expressed as a percentage of the ideal or "Nernstian response." Accordingly, it is an object of the invention to provide a glass for use in an electrode to provide the ideal or 100 percent "Nernstian response."

In general, in preparation of glasses for selective electrochemical response, an increase in the ratio of alumina to silica produces an improvement in response. However, an increase in the alumina/silica ratio also makes the glass more refractory and difficult to work. This general relationship has been found to be true in glasses on which the present invention is based. It is another important object of the invention to provide a glass which will have the desirable high ion selectivity and at the same time will be easy to melt, refine and work.

It has been found that the incorporation of phosphate into a lithia-alumina-silica mixture produces a new glass having substantially ideal ion selectivity and one which is readily melted, refined and fabricated into electrode membranes and the like. The lithia-alumina-silica glass may be made by conventional glass making techniques, starting with a prefusion mixture of oxides and salts of lithium, aluminum and silicon and including phosphorus, typically in the form of a phosphate. This may be a phosphate of one of the metals, such as aluminum phosphate, or may be a phosphate, such as ammonium phosphate, which on decomposition produces a volatile constituent which may be boiled away from the mixture. The form which the phosphorus assumes in the resultant glass is not fully known but it is clear that the phosphorus is present as the fabricated glass has the milky white color typical of phosphate glasses. The glass compositions given herein are based on the compositions of the prefusion mixtures and the phosphorus is considered to be present in the form of phosphorus pentoxide for purposes of the calculations.

The prefusion mixture, calculated composition, and performance of four glasses are given in Table I.

Table I

| | 1 | 2 | 3 | 4 |
|---|---|---|---|---|
| Prefusion Mixture (in parts by weight): | | | | |
| Silica Sand | 4 | 4 | 4 | 4 |
| Lithium Carbonate | 2 | 2 | 2 | 2 |
| Aluminum Phosphate | 0.2 | 0.5 | 1.5 | 1.5 |
| Aluminum Nitrate (crystals) | 4 | 3 | 0 | 0 |
| Ammonium Phosphate | 0 | 0 | 0 | 0.5 |
| Melting Characteristic | Poor | Acceptable | Good | Excellent |
| Glass Composition (in mol percent) (calculated from prefusion mix): | | | | |
| $SiO_2$ | 66.2 | 65.4 | 62.9 | 61.6 |
| $Li_2O$ | 26.9 | 26.6 | 25.5 | 25.0 |
| $Al_2O_3$ | 6.1 | 5.9 | 5.8 | 5.7 |
| $P_2O_5$ | 0.8 | 2.0 | 5.8 | 7.7 |
| Ratio $Al_2O_3/SiO_2$ | 0.09 | 0.09 | 0.09 | 0.09 |
| Response (percent of ideal) | 72.7 | 78.7 | 100 | (1) |

[1] See comment in text.

The glasses of Table I are all lithia-alumina-silica glasses with varying amounts of phosphate included therein. The table shows that the addition of phosphate to the prefusion mixture improves the melting characteristic. This is an expected result from experience in the glass-making field. However, the table also shows that an increase in the amount of phosphate, to a certain point, also produces an unexpected improvement in the ionic selectivity, with glass No. 3 having an ideal response. While the mixture of No. 4 was very easily melted, it was difficult to remelt and fabricate into a thin membrane and the resulting glass was not stable, degenerating rapidly on cooling. The membrane would not remain in form for the time necessary for testing but decomposed into flakes.

Figure 2:
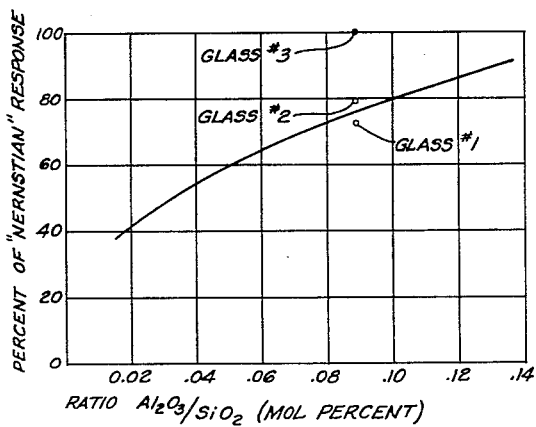

In the drawing, FIG. 1 is a graph showing the response of the preferred glass, and FIG. 2 is a graph showing the effects on response of varying the alumina-silica ratio.

We first consider FIG. 1, which shows the response of electrodes formed of glass No. 3 to sodium and potassium ion. In testing glasses for specific response, the following routine was used. Electrodes are made by mounting a glass membrane of the composition to be tested on a stem, the glass of which has a relatively high resistance. An internal electrolyte of known composition and good buffering capacity is then used to complete an internal circuit with a conventional half-cell for a "zero" potential. Test solutions are prepared, all 1/100 molar with respect to an alkali, potassium nitrate for example. Sodium content of the solutions is arranged from N/10, N/100, N/1000, N/10,000 sodium nitrate to approach pure water at N/100,000. A reference half-cell with flowing liquid junction is then paired with the electrode and the two successively tested in each of the five solutions for electrochemical potential. Tests are then continued on a second series of solutions containing potassium nitrate only in a similar concentration range. The curves of FIG. 1 were plotted from the test data. In an ideal situation, a glass which is sensitive only to sodium ions would yield the characteristic voltage or "Nernstian response" for each decade of concentration difference, while at the same time responding not at all to a similar change in potassium concentration.

From Table I and FIG. 1 it is seen that a prefusion mixture which produces about 6 mol percent phosphorus pentoxide results in an excellent glass for selective sodium ion concentration measurements. The response for glass No. 3 is ideal in the range of greatest interest, viz., from N/1000 to N/10 concentration. With less phosphorus pentoxide, the response of the glass is noticeably less, while with 7.7 percent phosphorus pentoxide the mixture will not produce a stable glass. Hence, the preferred working range for the phosphorus component is about 4 to 7 mol percent.

In general, lithia-alumina-silica mixtures with a ratio of alumina to silica greater than about 0.12 are highly refractory and very difficult to refine bubble free. Although glasses with the higher alumina-silica ratios may exhibit improved response characteristics, problems are encountered in their manufacture and use. It is desirable to maintain the alumina-silica ratio below 0.12 to facilitate manufacturing and with the glass of the present invention, the ideal response can be obtained with a ratio of 0.09 and lower which permits formation of a limpid, isotropic, molten glass substantially free of bubbles.

In FIG. 2, the curve shows the sodium ion response of lithia-alumina-silica glasses as a function of the alumina-silica ratio. Glasses 1, 2 and 3 are plotted on the graph to illustrate the effect of adding phosphate to the mixture.

The glass of the present invention is made by conventional mixing and heating techniques. The glass may be remelted and used to make the bulb or membrane of a glass electrode in the ordinary manner, such as is disclosed in the U.S. patent to Cary et al., No. 2,346,470. The preferred oxide and salt constituents are listed in Table I but, of course, the invention is not limited to glass made from these particular starting components. For example, the alumina could be introduced as an aluminum hydroxide (dried gel). The phosphate can be introduced as a salt of other raw materials, such as lithium phosphate or ammonium phosphate.

The tests reported herein were made in the conventional manner of measuring ion concentration. The glass electrode of the invention and a standard reference half-cell were inserted into the solutions to be tested and the two electrodes were connected to the input of a high impedance amplifier such as is used in conventional pH measurements. The output meter indications were recorded in millivolts for comparison with the ideal. When desired, the equipment may be calibrated to read directly in pNa by using standard solutions of known concentration.

Phosphate in glasses of the type described herein is fugitive, that is, the vapor pressure of the phosphorus is sufficiently high so that in the actual melting process, some phosphate may be lost by volatilization. Hence, the resultant glass may not contain as much phosphorus as was present in the prefusion mixture. Also, when a glass is held at an elevated temperature for working, a loss of phosphorus due to volatilization may continue.

In making the glasses described in the present application, a routine similar to commercial practice was followed. Less than 1 pound of mix was used in each batch. The mixture was raised to the melting temperature and maintained there for about 2 hours, and then permitted to cool to a solid mass. During the subsequent remelting to form the electrode membranes, the glass was again heated to the melting temperature and maintained there for about 30 minutes. From the data of Table I, it appears that there was very little loss of phosphorus during the melting steps described above as the performance characteristics are substantially different for the different calculated phosphorus contents. The discussion relative to fugitive phosphorus is introduced to establish that there is no actual maximum limit on the phosphorus content of a useable prefusion mixture. For example, the prefusion mixture of glass No. 4 might produce a glass corresponding to glass No. 3 by maintaining the melt at an elevated temperature for an extended period of time so as to drive off some of the undesired phosphorus. The actual time required for melting, refining and working can be determined by experiment following conventional electrode-fabricating techniques.

We claim as our invention:

1. A glass electrode for measuring alkali ion concentration, said electrode having a conductive glass membrane of lithia-alumina-silica composition, said membrane having a ratio in mol percent of alumina to silica not greater than about 12/100 and having phosphorus therein calculated in the prefusion mixture as about 4 to 7 mol percent phosphorus pentoxide.

2. A glass electrode for measuring alkali ion concentration, said electrode having a conductive glass membrane made from a prefusion mixture of salt and oxide which is calculated to provide in mol percent, about 25 lithia, 6 alumina, 63 silica and 4 to 7 phosphorus pentoxide.

3. A glass electrode as set forth in claim 1 wherein said glass membrane is free from alkaline earth metals in greater quantities than traces.

4. An ionic sensitive phosphate glass made from a prefusion mixture of salt and oxide which is calculated to provide in mol percent, about 25 lithia, 6 alumina, 63 silica, and 6 phosphorus pentoxide.

5. An ionic sensitive lithia-alumina-silica glass having a ratio in mol percent of alumina to silica not greater than about 12/100 and having phosphorus therein calculated in the prefusion mixture as about 4 to 7 mol percent phosphorus pentoxide, said glass being free from alkaline earth metals.

6. A method of making glass for a glass electrode membrane, including the steps of: mixing in parts by weight sand, 4, lithium carbonate, 2, and aluminum phosphate, 1.5; melting the mixture to form a limpid, isotropic, molten glass; and forming a membrane thereof.

7. A method of making a glass electrode, including the steps of: preparing a prefusion mixture of salt and oxide which is calculated to provide, in mol proportions, about 25 lithia, 6 alumina, 63 silica and 4 to 7 phosphorus pentoxide; melting the mixture to form a molten glass; cooling the melt; remelting the glass; and forming a membrane on a stem from a portion of the remelted glass, with the glass being maintained in a molten state for a total time less than that necessary to reduce by volatilization the phosphorus pentoxide proportion below 4.

References Cited in the file of this patent

UNITED STATES PATENTS

| | | |
|---|---|---|
| 1,964,629 | Grimm et al. | June 26, 1934 |
| 2,444,845 | Perley | July 6, 1948 |
| 2,469,211 | Schwartzwalder | May 3, 1949 |
| 2,559,805 | Stokey | July 10, 1951 |
| 2,571,242 | Hood | Oct. 16, 1951 |
| 2,829,090 | Eisenman et al. | Apr. 1, 1958 |

FOREIGN PATENTS

| | | |
|---|---|---|
| 124,318 | Australia | May 20, 1947 |

OTHER REFERENCES

Eisenman et al.: "Science," vol. 126, October 1957, pages 831–834.